United States Patent Office 2,846,305
Patented Aug. 5, 1958

2,846,305

SEPARATION AND RECOVERY OF MERCURY

Kenneth D. Ashley and Malden W. Michael, Stamford, Conn., assignors to American Cyanamid Company, New York, N. Y., a corporation of Maine No Drawing. Application April 5, 1954
Serial No. 421,196

3 Claims. (Cl. 75—121)

The present invention relates to improved methods of separating and/or recovering mercury which is present in low concentrations in chemical materials and, more particularly, relates to such recovery methods applied to mercury-containing sludges or residues arising in the production of alumina catalysts.

Considerable quantities of mercury are used in the manufacture of alumina catalysts by commercial processes, such as are described in greater particularity in U. S. Patents 2,345,600, 2,371,237 and Reissue 22,196, issued April 4, 1944, March 13, 1945, and October 6, 1942, respectively. In these processes, an alumina sol is prepared by dissolving metallic aluminum in an organic acid in the presence of a mercury compound. The aluminum and mercury form an amalgam which slowly dissolves with the evolution of hydrogen to yield the alumina sol containing mercury, undissolved aluminum, and other materials. This sol is pumped to a centrifuge, or other separation device, whereat a considerable portion of the mercury and other contaminating materials are separated and remain behind in the form of a residue or sludge while the alumina sol in a more purified form continues onwarmdly in the regular manufacturing procedure.

This centrifuge sludge normally contains on the order of from about 0.5% to about 5.0% mercury, from about 12 to 30% alumina, and lesser amounts of other materials, such as undissolved aluminum, organic salts of mercury, etc. Considerable quantities of such waste sludge-like materials are obtained in the regular course of operation in a plant and frequently amount to several hundred pounds or more a day. The disposal of such quantities represents a problem inasmuch as the presence of the mercury in the waste sludge makes it potentially dangerous and a possible hazard to the health of the community. Consequently, the waste materials can not be indiscriminately discarded.

It is, therefore, a principal object of the present invention to provide improved methods of separating and/or recovering mercury which is present in low concentrations in chemical materials whereby such materials become substantially mercury-free and may be disposed of more easily and safely or may be re-used, if so desired.

It has been found that the mercury may be separated and recovered from such waste materials by digesting the same in sulfuric acid under suitable conditions whereby the alumina and other contaminants which are present go into solution, whereas the mercury, which is unaffected by the sulfuric acid treatment, settles to the bottom and may subsequently be separated from the supernatant solution by filtration, decantation, or the like.

The concentrations of the sulfuric acid to be used in the digestion of the sludge or residue may be varied within relatively wide limits and a range of concentrations from about 10% to about 80% has been found satisfactory. However, within the more practical and commercial aspects of the present invention, it has been found that a preferred range of concentrations of from about 20% to about 30% sulfuric acid is desirable inasmuch as the materials are easier to handle within such concentrations and form solutions which do not thicken too much or require special equipment for handling.

The digestion of the sludge in the sulfuric acid takes place at any desired temperature within commercial or practical limits and for a sufficient period of time primarily in order to dissolve or digest the alumina or undissolved aluminum which forms an aluminum sulfate solution. The factors of temperature and time are interdependent and the higher the temperature, the shorter the duration of digestive treatment, and vice versa. Temperature ranges as low as about 70° C. and up to about 100° C. have been used with digestion periods of approximately 3 hours or more. Lower temperatures may be used with correspondingly longer periods of digestion time.

Following the treatment with the sulfuric acid and the dissolving of the alumina, there is obtained a fine colloidal suspension of mercury which settles and coalesces to form a heavy layer at the bottom of the container or kettle, when permitted to stand for a sufficient period of time. This heavy layer or mercury may then be separated by filtration, decantation, or other like methods. The mercury which has been so recovered has been found to be about 96 to 99% pure.

The undissolved aluminum and the alumina which was dissolved away from the mercury react with the sulfuric acid to form aluminum sulfate and, after separation of the mercury, such a solution may be recovered and re-used, if so desired. This alum solution contains some dissolved mercury, normally on the order of from about 30 to about 90 parts per million. In the event that it is desired to reduce this to a lower figure and recover additional mercury, or to obtain an alum solution which is even more mercury-free, then the alum solution is sulfided with hydrogen sulfide and filtered to separate the sulfide of mercury whereby the mercury concentration in the solution can be lowered to less than 0.1 part per million.

The invention will be further described in greater detail by the following specific examples. It is to be understood, however, that although these examples may describe in particular detail some of the specific features of the invention, they are given primarily for purposes of illustration and the invention in its broader aspects is not to be construed as limited thereto.

*Example 1*

252 lbs. of a centrifuge sludge (recovered from the production of an alumina catalyst as described in U. S. Patent 2,345,600) containing approximately 18% alumina ($Al_2O_3$) and 1.5% mercury was slurried with approximately 330 pounds of water in a glass-lined kettle. 173 pounds of concentrated sulfuric acid (96%) was slowly added thereto with stirring over a period of approximately 30 minutes. The mixture was then digested with stirring for approximately 4 hours at a temperature ranging from about 90° C. to about 98° C. The alumina was dissolved and the fine suspension of mercury settled to form a heavy layer at the bottom of the kettle in about 10 to 15 hours. The mercury was then separated from the supernatant solution which was discarded. The mercury recovered had a purity of approximately 98%.

*Example 2*

302 pounds of a centrifuge sludge obtained from the production of alumina catalysts as above-described and containing approximately 14% alumina and 2.0% mercury was slurried with approximately 390 pounds of water in a glass-lined kettle. 140 pounds of concentrated sulfuric acid (96%) was then added with stirring over a period of 30 minutes. The mixture was then digested with stirring for a period of approximately 4.5 hours at a temperature of about 95° C. The alumina was dissolved and the mercury settled as a heavy layer at the bottom of the kettle. The metallic mercury which was separated from the supernatant solution had a purity of about 97%.

*Example 3*

200 pounds of a centrifuge slurry containing approximately 22% alumina and 2.5% mercury was slurried with 270 pounds of water in a glass-lined kettle. 245 pounds of concentrated sulfuric acid (96%) was then added over a period of 45 minutes. The mixture was digested for a period of about 5 hours at a temperature of about 94° C. The alumina was dissolved and formed an alum solution. The fine suspension of mercury settled as a heavy layer to the bottom of the kettle. The mercury was separated from the alum solution by filtration and washing and was found to be approximately 96% pure.

*Example 4*

250 pounds of centrifuge sludge as described in Example 1 was digested as disclosed therein. The alum solution which was separated from the mercury was sulfided with hydrogen sulfide and then filtered whereby the dissolved suspended mercury which was originally present in a concentration of about 70 parts per million was reduced to less than 0.1 part per million.

*Example 5*

200 pounds of centrifuge sludge containing approximately 0.69% mercury and 15.4% alumina was slurried with approximately 100 pounds of water in a glass-lined kettle. Approximately 350 pounds of 20% sulfuric acid was slowly added thereto with stirring over a period of approximately 45 minutes. The mixture was then digested with stirring for approximately 4 hours at a temperature of approximately 100° C. but the solution possessed an opaque, grayish color at the end of the time. An additional 20 pounds of 40% sulfuric acid was then added to the solution which was heated for an additional hour with stirring at a temperature of approximately 100° C. The solution was then clear and transparent with a grayish sludge formation at the bottom of the kettle. The solution was then cooled and filtered to recover the metallic mercury which was determined to be approximately 97.9% pure.

*Example 6*

100 pounds of a centrifuge sludge containing approximately 19% alumina and 0.95% mercury was slurried with approximately 152 pounds of water. 63 pounds of concentrated sulfuric acid (96%) was slowly added thereto with stirring over a period of approximately 20 minutes. The mixture was then digested with stirring at a temperature of approximately 100° C. for about 3.5 hours. The solution was clear and transparent with sludge formation at the sides and at the bottom of the kettle. The solution was cooled and filtered and the recovered metallic mercury was determined to be approximately 96% pure.

The filtrate which contained approximately 73 parts per million of suspended mercury was then sulfided with hydrogen sulfide, the solution turned black, and was filtered. The filtrate contained less than 0.1 part per million of mercury.

Although we have described but a few specific examples of our invention, we consider the case not to be limited thereby nor to the specific substances mentioned therein, but to include various other equivalent compounds of similar constitution as set forth in the claims appended hereto. It is understood that any suitable changes or variations may be made without departing from the spirit or scope of the inventive concept.

What we claim is:

1. A method of separating mercury from alumina- and mercury-containing sludges arising in the production of alumina catalysts said sludges containing minor amounts of mercury of the order of about 0.5 to about 5% which comprises treating the sludge containing alumina and fine colloidal mercury with sulfuric acid having a concentration of from about 10% to about 80% to dissolve the alumina and form an aluminum sulfate solution, separating the mercury from said solution, and sulfiding the aluminum sulfate solution with hydrogen sulfide and filtering it to reduce still further the concentration of mercury therein.

2. A method of separating mercury from a mercury-alumina sludge obtained in the production of alumina sols by dissolving metallic aluminum in a dilute organic acid solution in the presence of a mercury compound and containing fine colloidal mercury, alumina and metallic aluminum said mercury being present in minor amounts of the order of about 0.5 to about 5% which comprises digesting said sludge in 10%-80% sulfuric acid at about 70°-100° C. and thereby dissolving the alumina and metallic aluminum and separating the mercury from the resulting solution.

3. A method as defined in claim 2 wherein the sulfuric acid has a concentration of from about 20% to about 30%.

References Cited in the file of this patent

UNITED STATES PATENTS

| | | |
|---|---|---|
| 49,637 | Mackie | Aug. 29, 1865 |
| 114,848 | Phillips | May 16, 1871 |
| 144,923 | Randol et al. | Nov. 25, 1873 |
| 845,853 | Clark | Mar. 5, 1907 |
| 890,160 | Morrison | June 9, 1908 |
| 1,185,499 | Grunstein | May 30, 1916 |
| 2,440,456 | Alley et al. | Apr. 27, 1948 |
| 2,710,799 | Leopard | June 14, 1955 |

FOREIGN PATENTS

| | | |
|---|---|---|
| 518,260 | Great Britain | Feb. 22, 1940 |
| 871,620 | France | Jan. 19, 1942 |

OTHER REFERENCES

"Comprehensive Treatise on Inorganic and Theoretical Chemistry" (Mellor), vol. 4, publ. by Longmans, Green and Company (London), 1923 (page 706 relied on).

Parkes and Mellor: "Modern Inorganic Chemistry," Longmans, 1939, page 669.

Berkman et al.: "Catalysis," New York: Reinhold, 1940, page 295.